July 27, 1965   P. HIMMELSBACH ETAL   3,196,546
PRECISION CALIPER
Filed Sept. 27, 1962
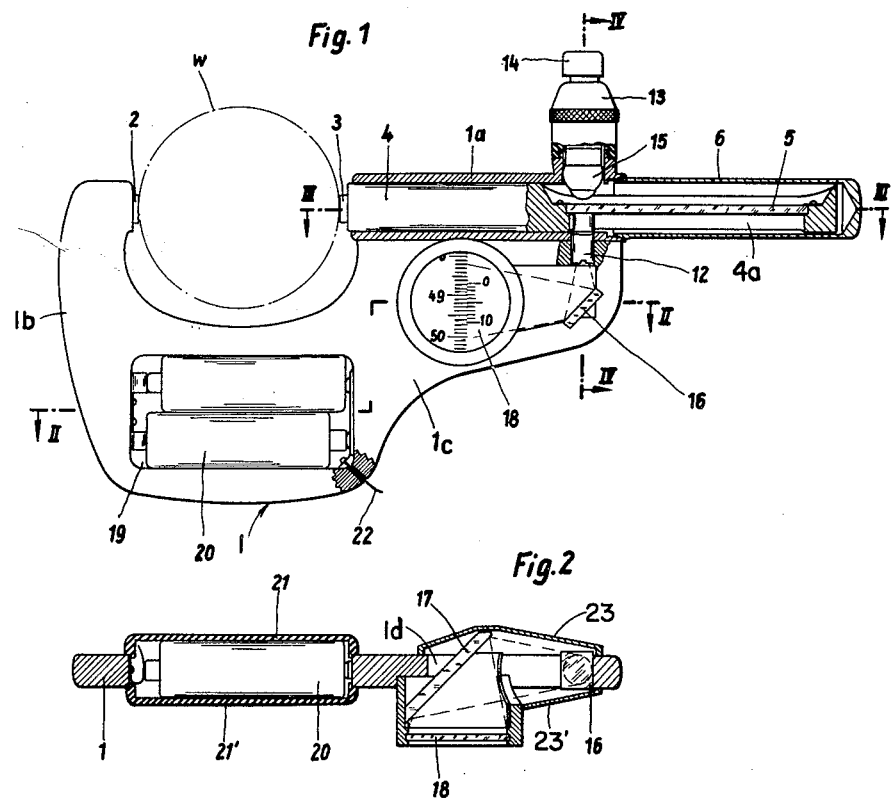
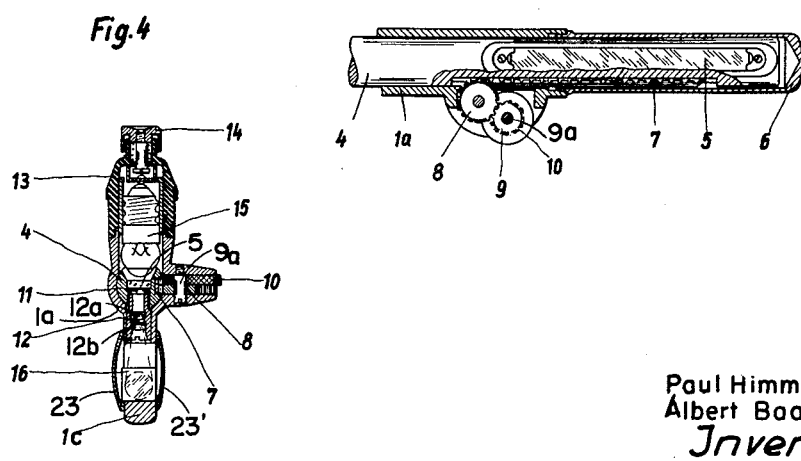
Paul Himmelsbach
Albert Baab
*Inventors*
Karl J. Ross
AGENT.

3,196,546
PRECISION CALIPER
Paul Himmelsbach and Albert Baab, Bad Kreuznach, Germany, assignors to Jos. Schneider & Co., Optische Werke, Bad Kreuznach, Rhineland, Germany, a corporation of Germany
Filed Sept. 27, 1962, Ser. No. 226,618
Claims priority, application Germany, Oct. 20, 1961, Sch 30,450
4 Claims. (Cl. 33—143)

Our present invention relates to a caliper for measuring the thickness of a workpiece received between two relatively movable stops.

The general object of this invention is to provide a caliper which combines the advantages of conventional sliding gauges, i.e. rapid adjustability and a relatively wide operating range, with the high degree of accuracy generally associated with known micrometer devices.

Another object of the invention is to provide a caliper which is easily readable and not subject to a rapid wearing of critical parts.

These objects are realized, in accordance with our invention, by the provision of a caliper carrying a fixed stop and a slidable stop in mutual alignment for receiving between them a workpiece to be measured, the movable stop being rigid with a light-transmissive (i.e. transparent or at least translucent) scale member next to which a light-transmissive vernier-scale carrier is so disposed that both can be jointly transluminated; an optical system on the support projects the markings of the transluminated principal and vernier scales upon a viewing surface, such as a ground-glass screen, where they can be read as an indication of the measured dimension of the workpiece.

The optical system carried on the preferably yoke-shaped support advantageously magnifies the projected scale markings to facilitate the reading of small increments of length. It is particularly convenient to position the viewing surface generally parallel to the sides of the yoke-shaped support, the transluminating light rays being directed toward this screen by one or more deflecting mirrors, prisms or the like disposed within a recess of the support itself. Other accessories, such as one or more battery cells for a transluminating light source, may also be accommodated in cutouts of the support.

These and other features of our invention will become more fully apparent from the following detailed description of a preferred embodiment, reference being made to the accompanying drawing in which:

FIG. 1 is a side-elevational view (parts broken away) of a precision caliper according to the invention; and FIGS. 2, 3 and 4 are cross-sectional views taken, respectively, on lines II—II, III—III and IV—IV of FIG. 1.

The instrument shown in the drawing comprises a supporting yoke 1 with a pair of jaws 1b, 1c respectively carrying a fixed stud 2 and a facing movable stud 3 adapted to engage a workpiece W from opposite sides. Stud 3 is integral with a piston 4 which is axially slidable, in alignment with stud 2, within a tubular guide sleeve 1a rigid with jaw 1c. Piston 4 is formed with a longitudinal slot 4a within which a light-transmissive scale member 5, e.g. of glass or transparent plastic material, is fixed to it. Member 5 resembles a conventional ruler, graduated with the usual scale markings in, say, millimeters or inches, except that subdivisions not distinguishable by the naked eye (e.g. tenths of millimeters) may be employed. The slotted portion of piston 4 with its scale member 5 is receivable in a protective shell 6 forming an outward extension of guide sleeve 1a and serving as a handle for the instrument.

The assembly 3, 4, 5 is axially displaceable in tube 1a, 6 by a control mechanism including a rack 7 fixed to piston 4, a pinion 8 engaging the rack 7 and another pinion 9 in mesh with pinion 8; pinion 9 is secured to a shaft 9a carrying a milled knob 10 to facilitate its manual rotation. The range of displacement, hence the effective length of scale member 5, may be of the order of 5 cm. or 2 inches.

A source of transluminating light rays, shown as a lamp 15, is disposed above the path of member 5 in a housing 13 which rises from sleeve 1a and carries a push-button switch 14 for energizing the lamp. Adjacent scale member 5 (directly below it, as seen in FIG. 4) there is positioned a vernier-scale carrier 11 which may be made of the same light-transmissive material as member 5 and is transluminated jointly therewith by light from the source 15. The disk-shaped carrier 11 is mounted at the top of a focusing tube 12 which supports projection lenses 12a, 12b, the optical axis of this system being perpendicular to the axis of tube 1a, 6 and defines therewith a plane parallel to the sides of yoke 1. Jaw 1c of this yoke is formed with a recess 1d which is laterally enclosed by opaque shields 23, 23' and by a viewing screen 18, such as a ground-glass plate, lying substantially parallel to the aforementioned plane and to the sides of the yoke. The image of the scale markings of ruler 5 and disk 11 is projected upon the screen 18 with the aid of two mirrors 16, 17 within recess 1d; the first mirror 16 deflects the rays from focusing tube 12 onto a path substantially parallel to the axis of piston 4 whereas the second mirror 17 directs them perpendicularly outwardly. As best seen in FIG. 4, the two flat, juxtaposed indicator members 5 and 11 have a common contact surface which is perpendicular to the plane of the yoke-shaped support or C-frame 1 and, therefore, to the light rays from source 15 which transluminate these members in a direction substantially perpendicular to that plane.

The yoke 1 is also fashioned with a cutout 19 accommodating a pair of battery cells 20 which serve as a power supply for lamp 15; the connection from these cells to the lamp, by way of manual switch 14, has been shown in part as a cable 22. The return path for the electric current may include the body of yoke 1 or, if desired, may lead through the studs 2 and 3 whereby, upon the measuring of a metallic workpiece W, lamp 15 will light only when both studs have made contact with the workpiece; in such case the switch 14 could also be omitted.

The magnification factor of the projection system 12, 16, 17 may be selected at will; a ratio of 10:1 will often be convenient. Thus, it is assumed in the illustrated embodiment that the vernier scale on disk 11, with its ten subdivisons, extends over a distance of 0.9 mm. although appearing with a length of 9 mm. on the viewing screen 18.

The improved instrument hereinabove disclosed may, of course, be modified in various ways without departing from the spirit and scope of our invention as defined in the appended claims.

We claim:

1. A precision caliper comprising a substantially flat yoke-shaped frame with a first jaw and a second jaw; a fixed first stud on said first jaw; a tubular guide element on said second jaw in line with said fixed stud, said guide element being provided with a handle-shaped extension facing away from said first jaw; a piston axially slidable in said guide element; a second stud carried on said piston for displacement therewith and facing said fixed stud; a pair of juxtaposed flat indicator members of light-transmissive material with a contact surface perepndicular to the plane of said frame mounted thereon in line with said piston, one of said indicator members being rigid with said piston and bearing a distance scale at least partly receivable in said extension, the other of said indicator members being fixed on said frame and bearing a vernier scale positioned for co-operation with said distance scale to represent the separation of said studs; a source of light mounted on said frame adjacent the junction of said guide element with said extension for translumination of said indicator members in a direction substantially in said plane and perpendicular to the direction of sliding motion of said piston, said frame being provided in the region of said second jaw with a recess aligned with said source for receiving transluminating light rays therefrom; optical magnifying means for said light rays in said recess; deflector means in said recess beyond said magnifying means for directing said light rays onto a path generally perpendicular to said plane; a viewing screen parallel to said plane carried on said frame at a location laterally offset from said guide element for illumination by said light rays upon their emergence from said recess; and control means on said frame in the region of said second jaw for slidingly displacing said piston in said guide element.

2. A caliper as defined in claim 1 wherein said deflector means includes a first mirror for directing said light rays within said recess along a line substantially parallel to said direction of motion and a second mirror for directing said light rays onto said generally perpendicular path at a location offset from said source toward said first jaw.

3. A caliper as defined in claim 1 wherein said light source comprises an electric lamp and electric cell means for energizing said lamp, said support being formed with a cutout accommodating said cell means.

4. A caliper as defined in claim 1 wherein said control means comprises a rack rigid with said one of said indicator members, a pinion engaging said rack and a manually rotatable knob operatively coupled with said pinion.

References Cited by the Examiner

UNITED STATES PATENTS

| 1,414,142 | 4/22 | Levy | 33—147 |
| 1,664,833 | 4/28 | Schaper | 33—147 |
| 1,974,606 | 9/34 | Fassin | 33—125 |
| 2,491,667 | 12/49 | Kent | 33—125 |
| 3,036,493 | 5/62 | Mottu et al. | 33—125 |
| 3,060,584 | 10/62 | Westfall | 33—143 |

FOREIGN PATENTS 692,997  6/40  Germany.

ISAAC LISANN, *Primary Examiner.*